(12) United States Patent
Allemand

(10) Patent No.: US 10,368,691 B2
(45) Date of Patent: Aug. 6, 2019

(54) COOKING VESSEL COMPRISING AN INTERIOR SURFACE OF PARTIALLY COATED STAINLESS STEEL, AND METHOD OF PRODUCING THE SAME

(71) Applicant: SEB S.A., Ecully (FR)

(72) Inventor: Simon Allemand, Cran Gevrier (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 15/513,705

(22) PCT Filed: Sep. 22, 2015

(86) PCT No.: PCT/FR2015/052541
§ 371 (c)(1),
(2) Date: Mar. 23, 2017

(87) PCT Pub. No.: WO2016/046492
PCT Pub. Date: Mar. 31, 2016

(65) Prior Publication Data
US 2017/0303737 A1    Oct. 26, 2017

(30) Foreign Application Priority Data
Sep. 23, 2014   (FR) .................................. 14 58977

(51) Int. Cl.
*A47J 36/04*   (2006.01)
*A47J 36/02*   (2006.01)
(Continued)

(52) U.S. Cl.
CPC ........... *A47J 36/025* (2013.01); *A47J 45/061* (2013.01); *B21D 51/22* (2013.01); *B23P 15/00* (2013.01); *B23P 2700/05* (2013.01)

(58) Field of Classification Search
CPC ....................................................... A47J 36/025
(Continued)

(56) References Cited

U.S. PATENT DOCUMENTS 3,493,726 A * 2/1970 Bardeau .................. A47J 36/02
                                                                 174/110 R
4,768,427 A * 9/1988 Cheng ..................... A47J 36/02
                                                                 126/390.1
(Continued)

FOREIGN PATENT DOCUMENTS

CN      202044090 U    11/2011
CN      103230216 A     8/2013
(Continued)

*Primary Examiner* — Allan D Stevens
(74) *Attorney, Agent, or Firm* — The Webb Law Firm

(57) ABSTRACT

A cooking vessel includes a vessel body having a partially coated, textured stainless steel inner surface having a plurality of ribs rising above recesses having bottoms covered with a non-stick coating. The ribs have uncoated tops and sides that are separate from the bottoms of the cavities. The sides connect the tops to the bottoms. The tops rise above the non-stick coating covering the bottoms. According to the invention, the non-stick coating rises over the sides from the bottoms towards the tops without exceeding the height of the tops, and the bottoms and the sides have a rough surface under the non-stick coating. Also included is a method for producing a cooking vessel.

21 Claims, 9 Drawing Sheets

(51) Int. Cl.
　　　*A47J 45/06*　　　(2006.01)
　　　*B21D 51/22*　　　(2006.01)
　　　*B23P 15/00*　　　(2006.01)

(58) Field of Classification Search
　　　USPC ...................................................... 220/573.2
　　　See application file for complete search history.

(56)　　　　　　　　References Cited

U.S. PATENT DOCUMENTS

| | | | |
|---|---|---|---|
| 5,628,426 | A | 5/1997 | Doyle et al. |
| 2004/0115477 | A1* | 6/2004 | Nesbitt ................ A47J 36/025 428/692.1 |
| 2008/0083747 | A1 | 4/2008 | Park |
| 2011/0192850 | A1* | 8/2011 | Le Bris .................. A47J 36/02 220/573.2 |
| 2014/0004311 | A1 | 1/2014 | Alim |
| 2014/0154476 | A1* | 6/2014 | Perillon .................... B05D 5/08 428/172 |
| 2016/0113439 | A1 | 4/2016 | Fu et al. |

FOREIGN PATENT DOCUMENTS

| | | | |
|---|---|---|---|
| FR | 2813177 | A3 | 3/2002 |
| KR | 1008043870000 | B1 | 2/2001 |
| WO | 2011069351 | A1 | 6/2011 |

* cited by examiner

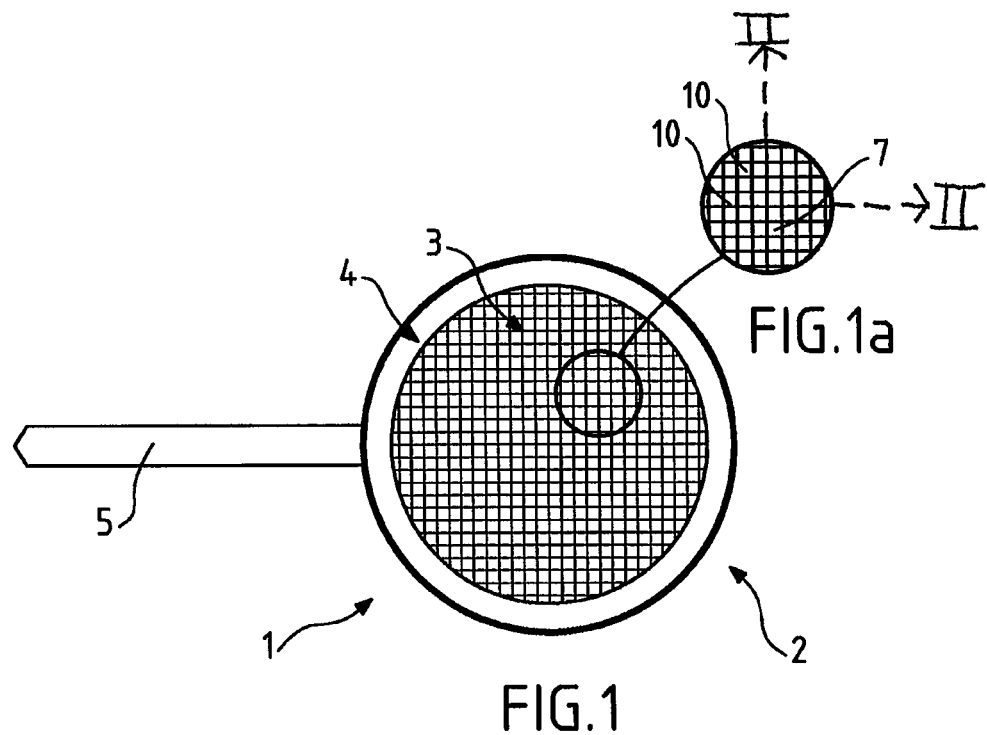
FIG.1
FIG.1a
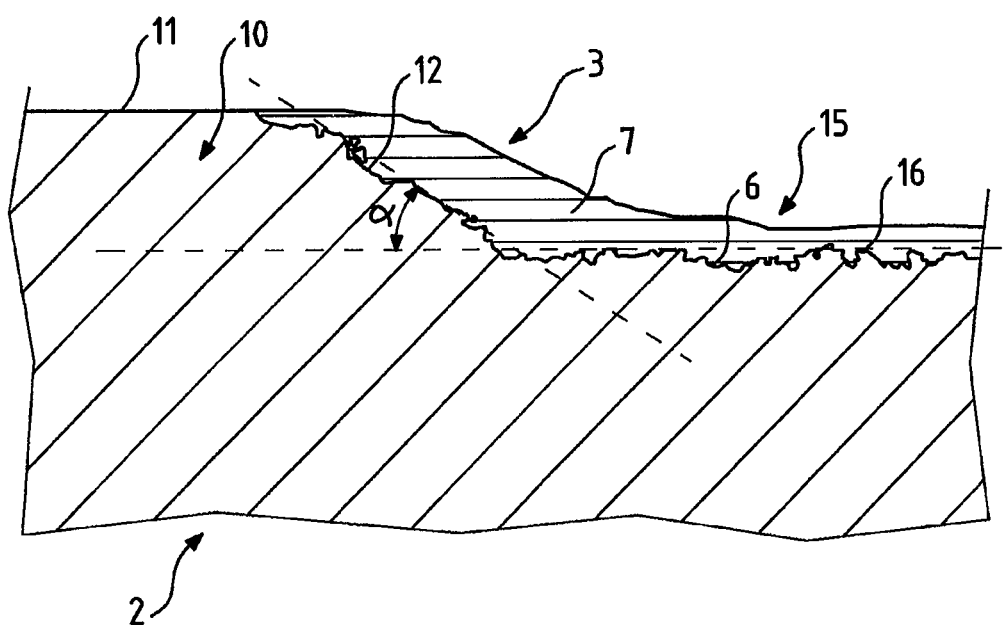
FIG.2

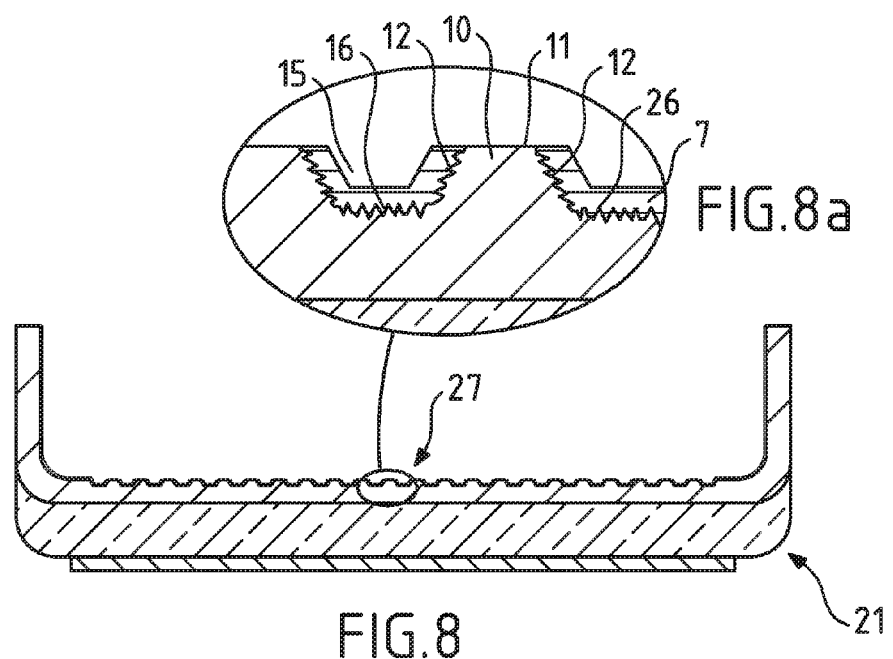
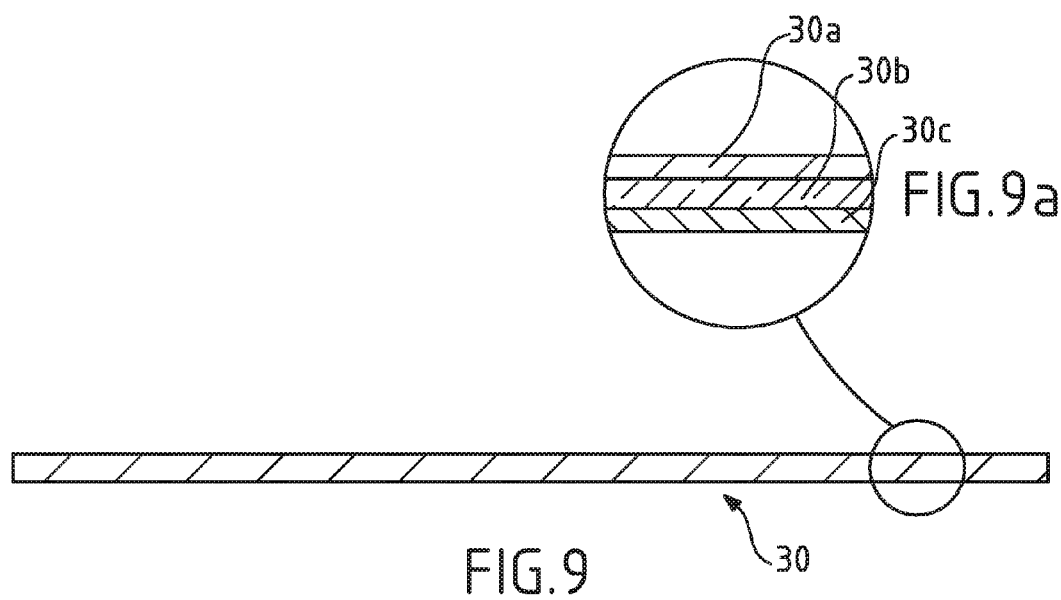

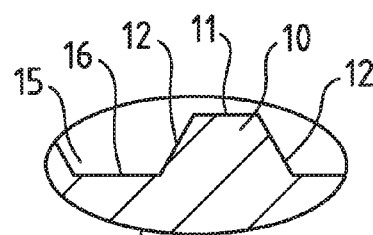
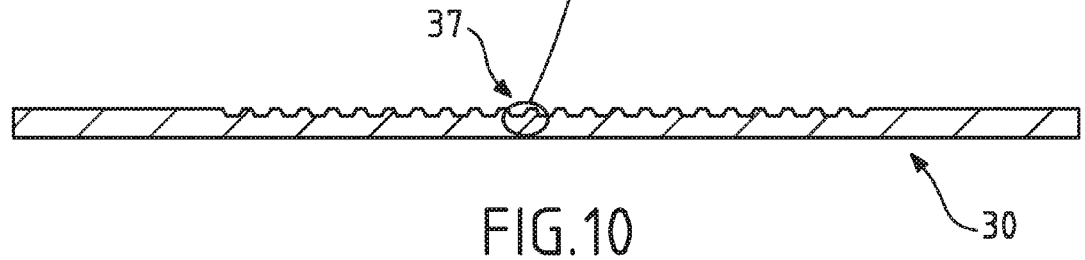
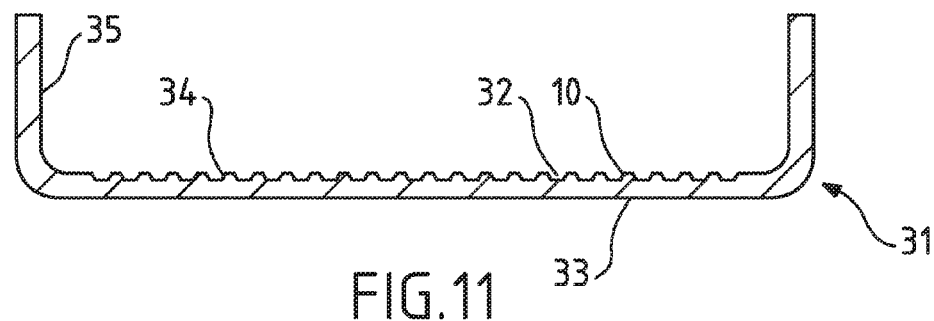
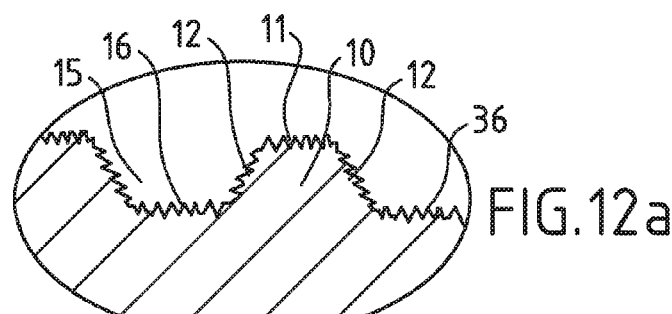
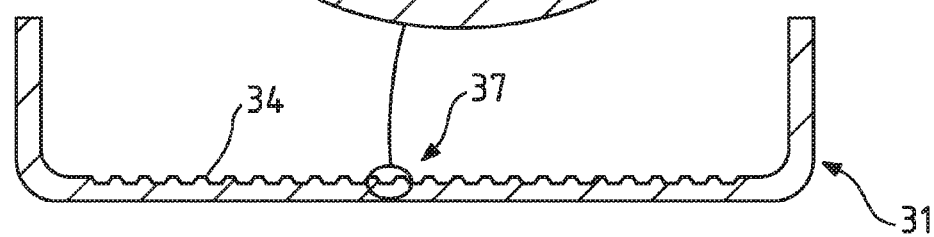

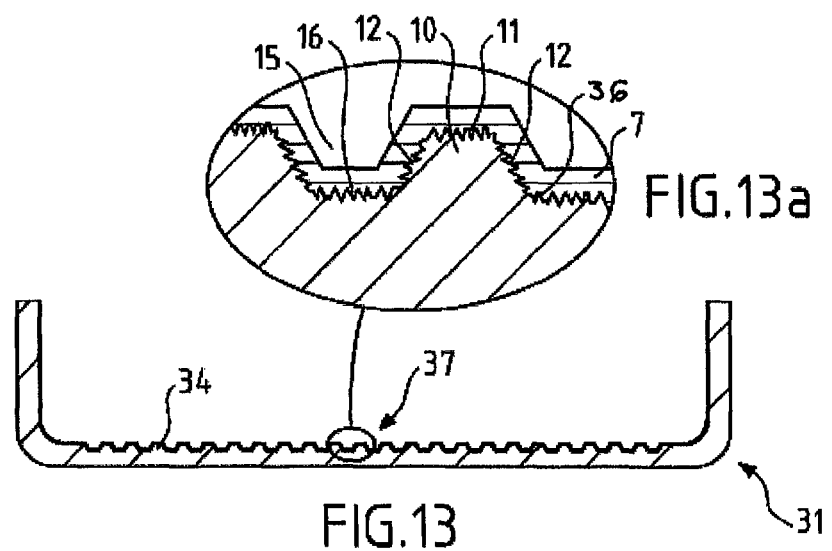
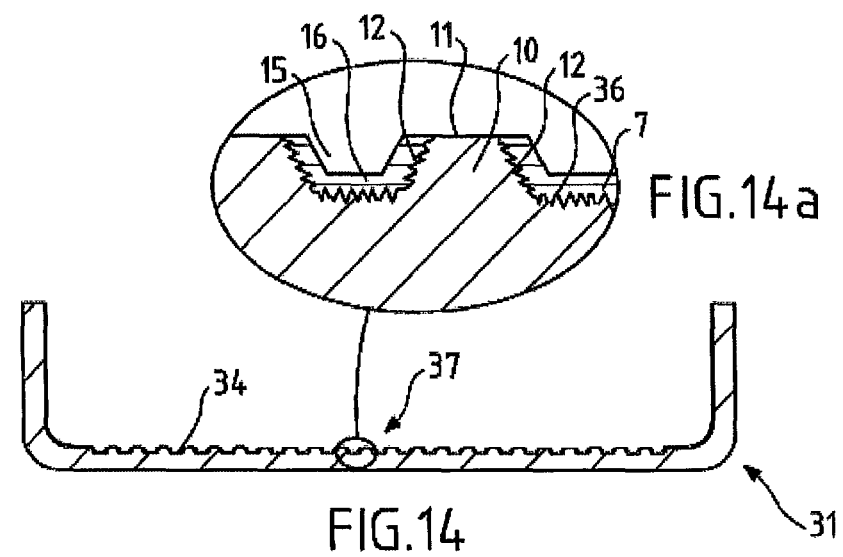

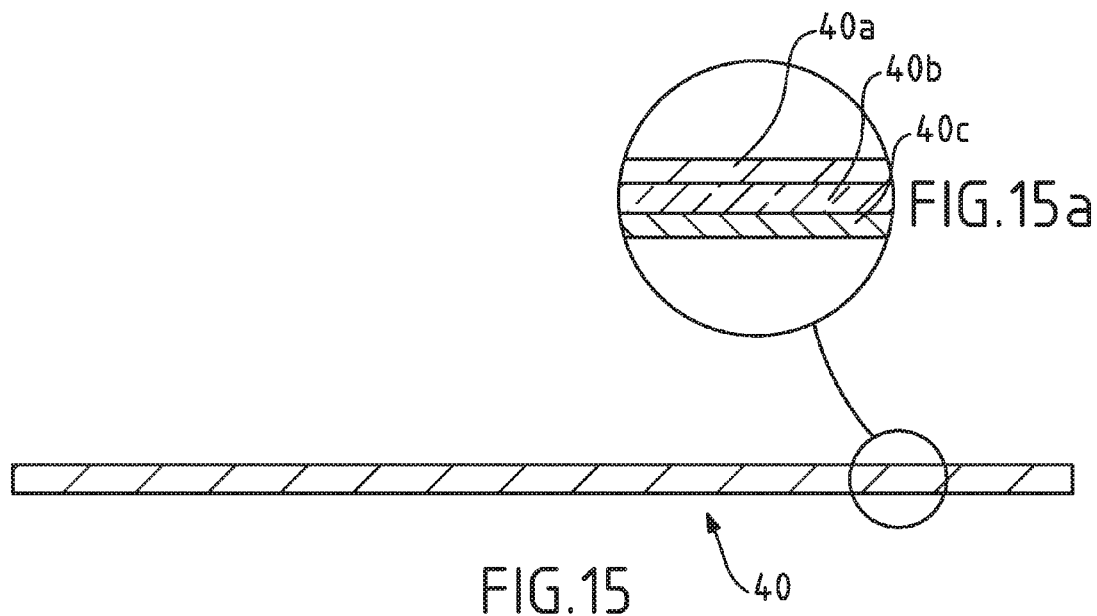
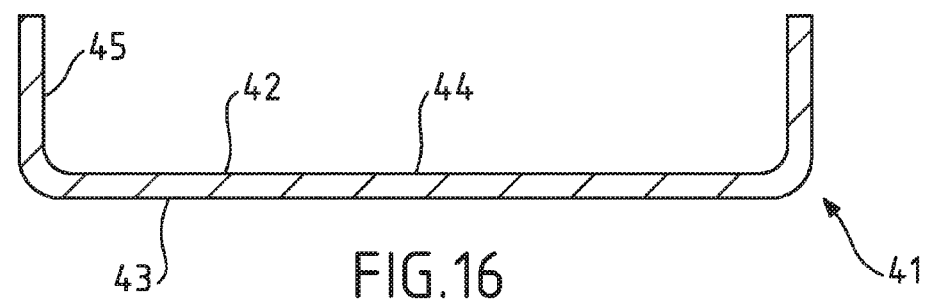

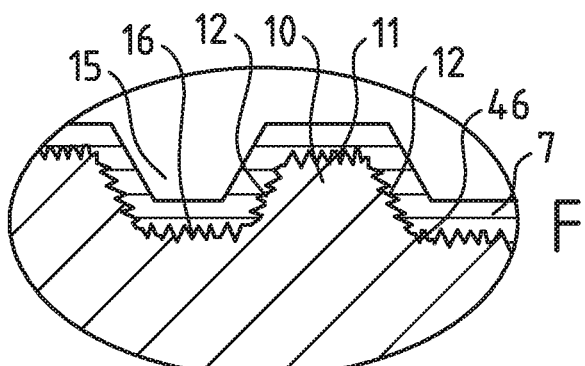
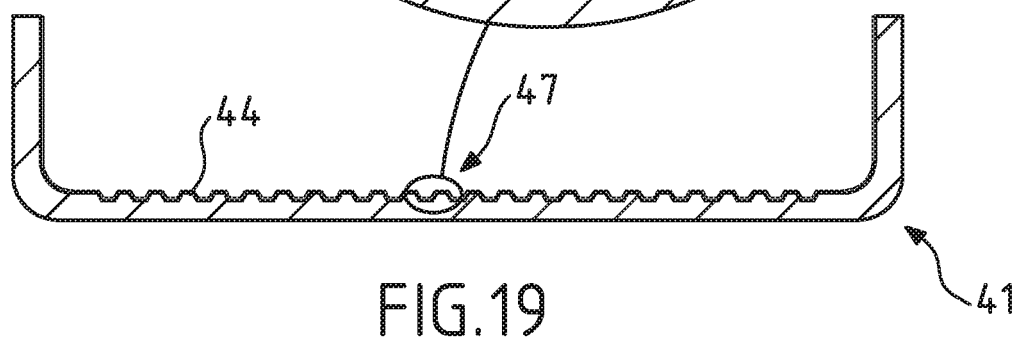
FIG.19
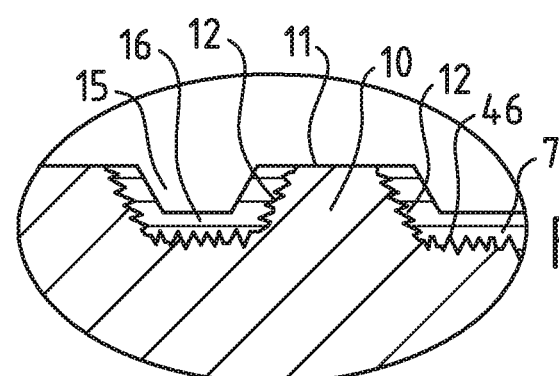
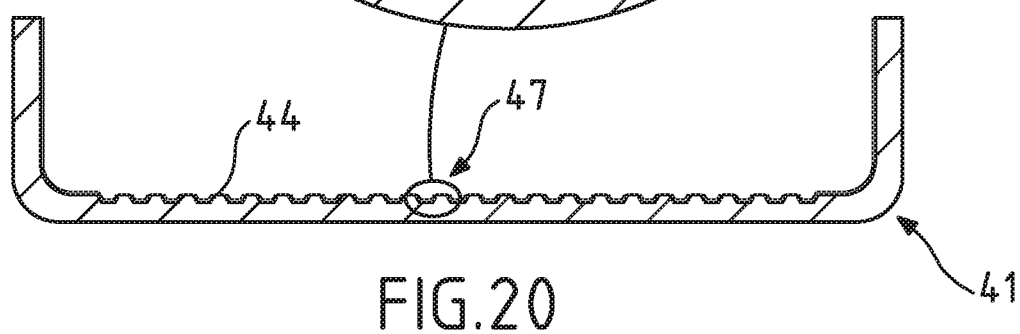
FIG.20

COOKING VESSEL COMPRISING AN INTERIOR SURFACE OF PARTIALLY COATED STAINLESS STEEL, AND METHOD OF PRODUCING THE SAME

CROSS-REFERENCE TO RELATED APPLICATIONS

This application is the United States national phase of International Application No. PCT/FR2015/052541 filed Sep. 22, 2015, and claims priority to French Patent Application No. 1458977 filed Sep. 23, 2014, the disclosures of which are hereby incorporated in their entirety by reference.

BACKGROUND OF THE INVENTION

Field of the Invention

The present invention pertains to the technical field of cooking vessels comprising an interior surface made of partially coated stainless steel.

More precisely, the present invention pertains to cooking vessels drawn from a sheet of stainless steel or from a multilayer sheet having at least one outer layer of stainless steel, as well as their method of production.

The present invention pertains, in particular, to culinary items designed to be used on cooktops, such as frying pans or sauce pans, for example.

The present invention also pertains to the vessels of electronic culinary devices, particularly, but not exclusively, removable vessels.

Description of Related Art

Patent document KR100804387B1 discloses a cooking vessel comprising an interior surface made of partially coated stainless steel. The interior surface has a plurality of valleys, the bases of which bear a non-stick coating. The interior surface has ribs that are spaced between the valleys. The uncoated top surfaces of the ribs extend beyond the non-stick coating covering the bottom surface of the valleys. However, the ribs have uncoated lateral surfaces that extend above the bottom surface of the valleys. The lateral surfaces of the ribs are perpendicular to the bottom surface of the valleys. The realization of such an object made of stainless steel would be difficult following the drawing process proposed in this document.

SUMMARY OF THE INVENTION

One objective of the present invention is to propose a cooking vessel with a cooking surface that offers both ease of cleaning and durability, even when used with utensils made of hard materials, such as metal utensils, for example.

Another objective of the present invention is to propose a method of producing a cooking vessel having a cooking surface that offers both ease of cleaning and durability, even when used with utensils made of hard materials, such as metal utensils, for example.

These objectives are achieved with a cooking vessel comprising a vessel body having a texturized interior surface made of partially coated stainless steel, the texturized interior surface having a plurality of ribs that extend above valleys, the valleys having bottom surfaces coated with a non-stick coating, the valleys having top surfaces that are uncoated and side surfaces distinct from the bottom surfaces of the valleys, the side surfaces of the ribs connecting the top surfaces of the ribs to the bottom surfaces of the valleys, the top surfaces of the ribs extending above the non-stick coating that covers the bottom surfaces of the valleys, such that the non-stick coating extends up the side surfaces of the ribs from the bottom surfaces of the valleys toward the top surfaces of the ribs, without exceeding the height of the top surfaces, and that the bottom surfaces of the valleys and the side surfaces of the ribs have a roughened surface underneath the non-stick coating, to promote adhesion of the non-stick coating. These arrangements simplify the production of the metal body component of the vessel. These arrangements also improve the adhesion of the non-stick coating, as the non-stick coating is applied to the entire surface of the texturized interior surface, followed by a brushing of the top surfaces of the ribs. The initial application of a single layer of non-stick coating improves the quality of the coating. The durability of the cooking vessel is improved, all while preserving the good mechanical resistance of the cooking surface due to the metal top surfaces of the ribs that extend above the coated bottom surfaces of the valleys.

Advantageously, the side surfaces of the ribs form ramps that connect the top surfaces of the ribs to the bottom surfaces of the valleys. This arrangement improves the adhesion of the coating on the side surfaces of the ribs.

Also advantageously, the thickness of the non-stick coating is greater on the lower portion of the sides of the ribs than on the upper portion of the sides of the ribs. This arrangement improves the adhesion of the coating on the lower portion of the side surfaces of the ribs and on the adjacent portions of the bottom surfaces of the valleys.

Also advantageously, the width of the top surfaces of the ribs is less than the distance between the top surfaces of two adjacent ribs. This arrangement makes it possible to produce a texturized interior surface with a coated surface area that is larger than the uncoated metal surface area of the top surfaces of the ribs.

Also advantageously, the width of the top surfaces of the ribs is less than the width of the bottom surfaces of the valleys extending between the two adjacent ribs.

This arrangement makes it possible to produce a texturized interior surface with a larger coated surface area.

Also advantageously, the side surfaces of the ribs extend upwards from the bottom surfaces of the valleys at an angle (α) less than 45°, and preferably, at an angle (α) between 20° and 40°. This arrangement simplifies the realization of the ribs. This arrangement also makes it possible to improve the adhesion of the coating to the sides of the ribs.

Also advantageously, the top surfaces of the ribs are flat. This arrangement facilitates the movement of cooking utensils across the ribs, to stir, separate or serve foods. This arrangement also simplifies the realization of the top surfaces of the ribs. If desired, the top surfaces of the ribs may be polished, which would reduce the adhesion of foods.

Also advantageously, the ribs are of a trapezoidal configuration. This arrangement simplifies the realization of the ribs.

Also advantageously, the depth of cut defined between the top surfaces of the ribs and the bottom surfaces of the valleys is between 0.05 mm and 0.2 mm. This arrangement makes it possible to produce a cooking vessel with the proper features for use, while remaining easy to produce.

In one embodiment, the non-stick coating has an outer layer of PTFE.

In another embodiment, the non-stick coating has an outer layer of ceramic sol-gel.

The vessel body may be made of stainless steel. Thus, advantageously, an aluminum heat diffuser plate partially covers the exterior surface of the cooking vessel to ensure proper heat distribution. Also advantageously, a stainless steel base plate covers the heat diffuser plate. Thus, advantageously, the base plate is made of ferritic stainless steel, to enable the induction heating of the cooking vessel.

The vessel body may also be made of a multilayer material comprising at least one outer layer of stainless steel.

Also advantageously, the cooking vessel comprises at least one handle mounted to the vessel body.

Also advantageously, the ribs are interconnected and delimit distinct valleys. This arrangement facilitates the movement of cooking utensils across the ribs, to stir, separate or serve foods.

These objectives may also be achieved with a method to produce a cooking vessel comprising the following steps:
  Realization or provision of a blank from a sheet of stainless steel,
  Drawing of the blank to form a cap comprising an interior surface and an exterior surface, the interior surface comprising a flat base area surrounded by a side wall,
  Hot stamping of a diffuser base on the exterior surface of the cap, with the engraving of a grid pattern, engraving on at least one portion of the base area of the interior surface of the cap to form a network of ribs having top surfaces that extend above the valleys and side surfaces distinct from the bottom surfaces of the valleys, the side surfaces of the ribs connecting the top surfaces of the ribs to the bottom surfaces of the valleys,
  Sanding of at least the engraved base area of the interior surface of the cap, to create roughness,
  Application of a non-stick coating on to at least the sanded, engraved base area,
  Brushing and/or polishing of at least the coated, sanded, engraved base area to reveal the stainless steel on the top surfaces of the ribs.

Thus, advantageously, the method consists of hot stamping base plate of ferritic stainless steel onto the surface of the diffuser base opposite the cap, while the diffuser base is hot stamped onto the exterior surface of the cap, to enable the induction heating of the cooking vessel.

These objectives may also be achieved with a method to produce a cooking vessel comprising the following steps:
  Realization or provision of a blank from a multilayer sheet of steel comprising at least one outer surface made of stainless steel,
  Engraving of a grid pattern on at least one portion of said outer surface made of stainless steel, to form a network of ribs having top surfaces that extend above the valleys and side surfaces that are distinct from the bottom surfaces of the valleys, the side surfaces of the ribs connecting the top surfaces of the ribs to the bottom surfaces of the valleys,
  Drawing of the blank to form a cap comprising an interior surface and an exterior surface, the interior surface comprising a base area surrounded by a side wall, the ribs extending across at least one portion of the base area,
  Sanding of at least the engraved base area to create roughness,
  Application of a non-stick coating on to at least the sanded, engraved base area,
  Brushing and/or polishing of the coated, sanded, engraved base area to reveal the stainless steel on the top surfaces of the ribs.

The engraving of a grid pattern may in particular be achieved with stamping, preferably by hot stamping, or by laser engraving.

These objectives may also be achieved with a method to produce a cooking vessel comprising the following steps:
  Realization or provision of a blank from a multilayer sheet of steel comprising at least one outer surface made of stainless steel,
  Drawing of the blank to form a cap comprising an interior surface formed by said outer surface of stainless steel and an exterior surface, the interior surface comprising a base area surrounded by a side wall,
  Engraving of a grid pattern on at least one portion of the base area, to form a network of ribs having top surfaces that extend above the valleys and side surfaces distinct from the bottom surfaces of the valleys, the side surfaces of the ribs connecting the top surfaces of the ribs to the bottom surfaces of the valleys,
  Sanding of at least the engraved base area to create roughness,
  Application of a non-stick coating on to at least the sanded, engraved base area,
  Brushing and/or polishing of the coated, sanded, engraved base area to reveal the stainless steel on the top surfaces of the ribs.

The engraving of a grid pattern may in particular be achieved with stamping, preferably by hot stamping, or by laser engraving.

Thus, advantageously, a polishing of the top surfaces of the ribs is performed prior to the application of the non-stick coating, to limit the adhesion of the non-stick coating on the top surfaces of the ribs.

These objectives may also be achieved with a cooking vessel obtained by a method according to the aforementioned characteristics.

BRIEF DESCRIPTION OF THE DRAWINGS

The invention will be more clearly understood upon review of one example of one embodiment of a cooking vessel and of three embodiments of a method to produce a cooking vessel, provided as non-limiting examples, illustrated in the annexed figures, in which:

FIG. 1 is a schematic top view of one embodiment of a cooking vessel according to the invention, with FIG. 1a representing an enlarged sectional view of the interior surface of the cooking vessel represented in FIG. 1, FIG. 2 is a partial cross-section view of the cooking vessel illustrated in FIGS. 1 and 1a, and which is shown across section II-II of FIG. 1a, FIGS. 3 to 8 schematically illustrate the steps of one initial embodiment of a method to produce a cooking vessel according to the invention.

FIG. 8 is a schematic cross-section of the drawn, sanded, coated blank represented in FIG. 7, after the brushing and/or polishing of the top surfaces of the ribs formed on the base of the inner surface of the blank, with FIG. 8a representing an enlarged sectional view of the upper portion of the base of the inner surface of the blank represented in FIG. 8, FIGS. 9 to 14 schematically depict the steps of a second embodiment of a method to produce a cooking vessel according to the invention, FIG. 9 is a schematic cross-section of a three-layer blank comprising at least one outer surface of stainless steel, the three layers being depicted in FIG. 9a, showing one portion of the blank represented in FIG. 9, FIG. 10 is a schematic cross-section view of the blank represented in FIG. 9, after the engraving of one portion of the inner surface of the blank, with FIG. 10a representing an enlarged sectional view of the upper portion of the inner surface of the blank represented in FIG. 10, FIG. 11 is a schematic cross-section view of the engraved blank represented in FIG. 10, after drawing, FIG. 12 is a schematic cross-section of the engraved, drawn blank represented in FIG. 11, after the sanding of the base of the inner surface of the blank, with FIG. 12a representing an enlarged sectional view of the upper portion of the base of the inner surface of the blank represented in FIG. 12, FIG. 13 is a schematic cross-section of the engraved, drawn, sanded blank represented in FIG. 12 after the application of a coating on the base of the inner surface of the blank, with FIG. 13a representing an enlarged sectional view of the upper portion of the base of the inner surface of the blank represented in FIG. 13, FIG. 14 is a schematic cross-section of the drawn, sanded, coated blank represented in FIG. 13, after the brushing and/or polishing of the top surfaces of the ribs formed on the base of the inner surface of the blank, with FIG. 14a representing an enlarged sectional view of the upper portion of the base of the inner surface of the blank represented in FIG. 14, FIGS. 15 to 20 schematically depict the steps of a third embodiment of a method to produce a cooking vessel according to the invention, FIG. 15 is a schematic cross-section of a three-layer blank comprising at least one outer surface of stainless steel, the three layers being depicted in FIG. 15a, showing one portion of the blank represented in FIG. 15, FIG. 16 is a schematic cross-section view of the blank represented in FIG. 15, after drawing, FIG. 19 is a schematic cross-section of the engraved, drawn, sanded blank represented in FIG. 19 after the application of a coating on the base of the inner surface of the blank, with FIG. 19a representing an enlarged sectional view of the upper portion of the base of the inner surface of the blank represented in FIG. 19, FIG. 20 is a schematic cross-section of the drawn, sanded, coated blank represented in FIG. 19, after the brushing and/or polishing of the top surfaces of the ribs formed on the base of the inner surface of the blank, with FIG. 20a representing an enlarged sectional view of the upper portion of the base of the inner surface of the blank represented in FIG. 20,

DETAILED DESCRIPTION OF THE INVENTION

Figure 3:
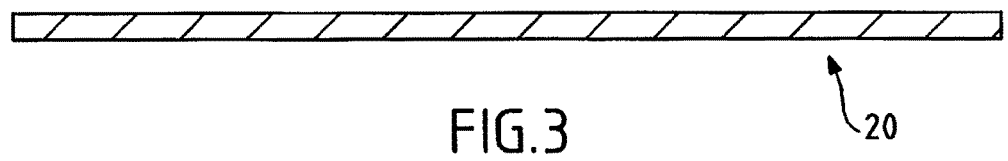
FIG. 3 is a schematic cross-section view of a stainless steel blank.
Figure 4:
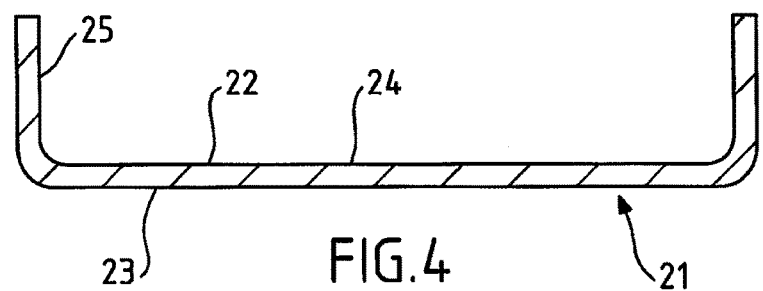
FIG. 4 is a schematic cross-section view of the blank represented in FIG. 3, after drawing.

FIG. 1 illustrates one example embodiment of a cooking vessel (1) comprising a vessel body (2) having a texturized interior surface (3) made of partially-coated stainless steel. The texturized interior surface (3) forms a cooking surface. As represented in FIG. 1, the texturized interior surface (3) is surrounded by a non-texturized interior surface (4). The non-texturized interior surface (4) may be coated or uncoated. The coated, non-texturized interior surface (4) would preferably have the same coating as the texturized interior surface (3). The coated, non-texturized interior surface is preferably made of polished stainless steel.

In one embodiment illustrated in FIG. 1, the texturized interior surface (3) extends over a flat portion forming the base of the vessel body (2), and the non-texturized interior surface (4) extends over a side wall extending up from the base of the vessel body (2). The cooking vessel (1) may be, in particular, a frying pan or saucepan, or even a vessel from an electronic culinary device with a flat base.

In one variation, the texturized interior surface (3) may extend at least partially up the side wall from the base of the vessel body (2). The vessel body (2) thus does not necessarily present a non-texturized interior surface (4). The texturized interior surface (3) may thus cover the entirety of the interior of the cooking vessel.

In one variation, the base of the vessel body (2) is not necessarily flat. The cooking vessel (1) may thus, in particular, be a wok, or may be a vessel from an electronic culinary device with a concave base.

As illustrated in FIG. 1, the cooking vessel (1) comprises a handle (5) mounted to the vessel body (2). As desired, the cooking vessel (1) may comprise at least one other handle mounted to the vessel body (2). The vessel body (2) depicted in FIG. 1 has a circular form. In one variation, the vessel body (2) may have other forms, in particular an oval or elliptical form.

Figure 5A:
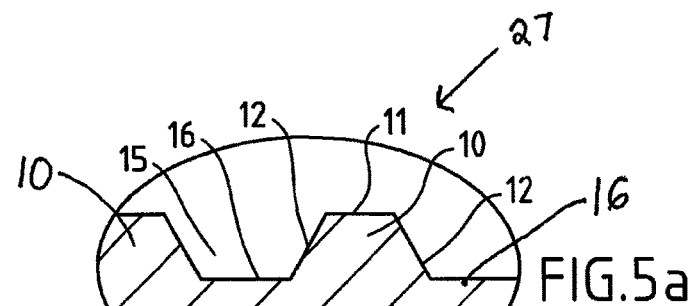
FIG. 5 is a schematic cross-section view of the drawn blank represented in FIG. 4, after assembly with a diffuser base on the outer surface of the base of the blank and engraving of the base of the inner surface of the blank, with FIG. 5a representing an enlarged sectional view of the top portion of the base of the inner surface of the blank represented in FIG. 5.
Figure 5:
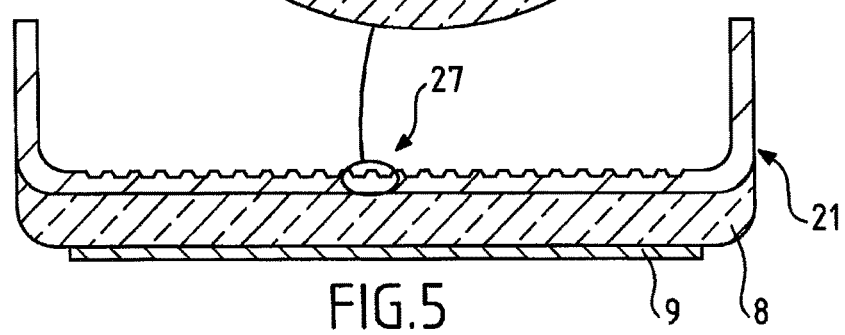
Figure 6:
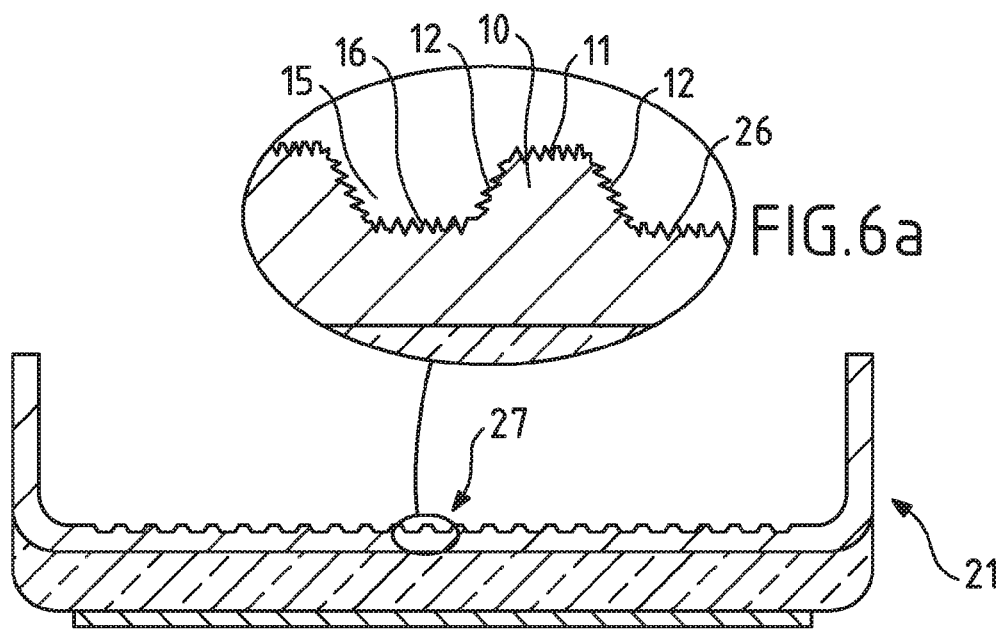
FIG. 6 is a schematic cross-section of the drawn blank represented in FIG. 5, after sanding of the base of the inner surface of the blank, with FIG. 6a representing an enlarged sectional view of the upper portion of the base of the inner surface of the blank represented in FIG. 6.
Figure 7:
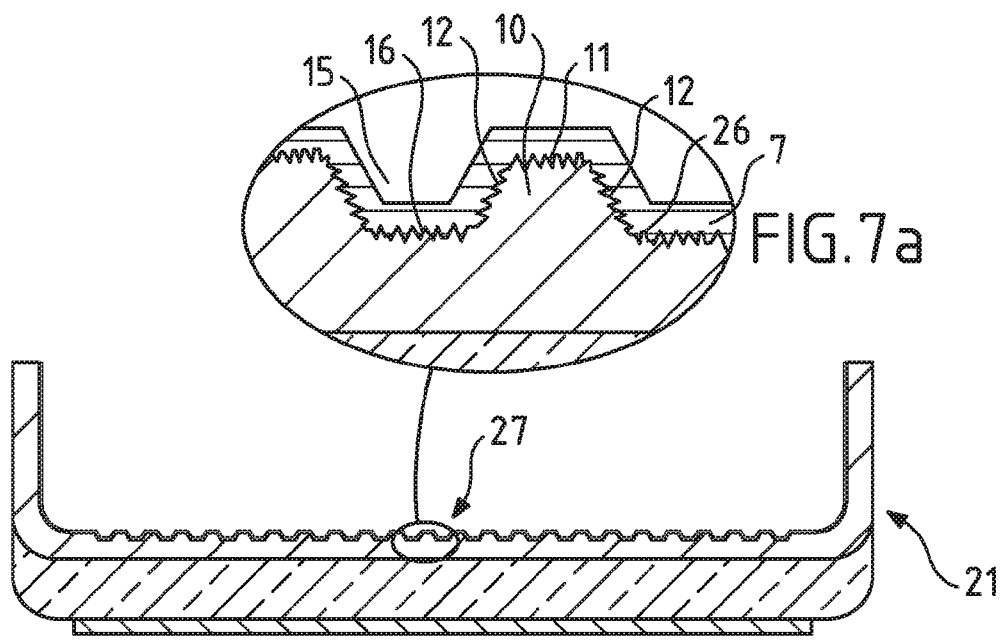
FIG. 7 is a schematic cross-section of the drawn, sanded blank represented in FIG. 6, after the application of a coating on the base of the inner surface of the blank, with FIG. 7a representing an enlarged sectional view of the upper portion of the base of the inner surface of the blank represented in FIG. 7.
Figures 17, 17A:
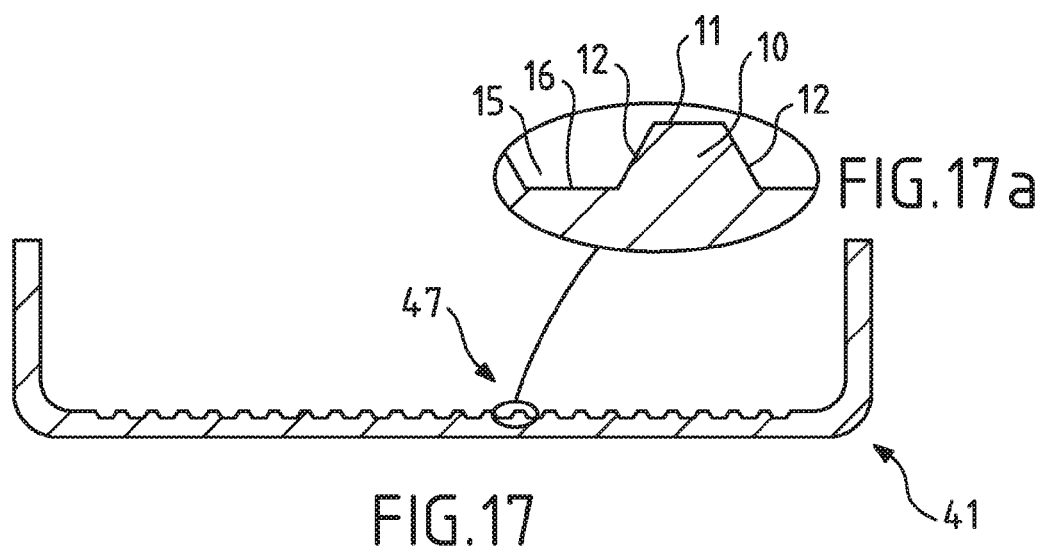
FIG. 17 is a schematic cross-section of the drawn blank represented in FIG. 16, after the engraving of one portion of the inner surface of the blank, with FIG. 17a representing an enlarged sectional view of the upper portion of the inner surface of the blank represented in FIG. 17.
Figures 18, 18A:
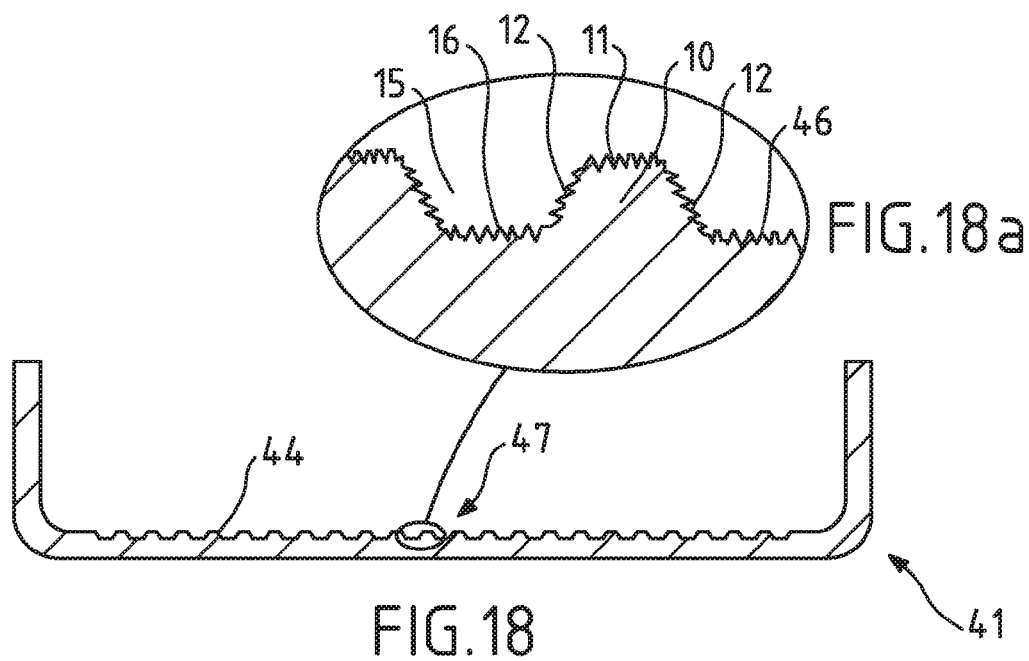
FIG. 18 is a schematic cross-section of the engraved, drawn blank represented in FIG. 17, after the sanding of the base of the inner surface of the blank, with FIG. 18a representing an enlarged sectional view of the upper portion of the base of the inner surface of the blank represented in FIG. 18.

In one initial embodiment, the vessel body (2) may be produced from a blank (20) of stainless steel, depicted in FIG. 3. Preferably, the stainless steel is of the austenitic variety and in particular a stainless steel of the grade 304, or a ferritic variety, and in particular a stainless steel of the grade 441. To ensure good heat distribution across the interior surface of the vessel body (2) the vessel body (2) advantageously has a corresponding diffuser base (8) made of a highly heat-conductive material (aluminum alloy, copper, etc.), depicted in FIG. 5. As desired, the corresponding diffuser base (8) may be positioned between the vessel body (2) and a base plate (9) preferably made of ferritic stainless steel, to enable the induction heating of the cooking vessel (1).

In a second embodiment, the vessel body (2) may be produced from a multilayer blank (30; 40) comprising at least one outer surface (30a; 40a) made of stainless steel, depicted in FIGS. 9 and 15. The outer surface (30a; 40a) made of stainless steel is intended to form the interior surface of the vessel body (2). The outer surface (30a; 40a) made of stainless steel is, preferably, made of austenitic stainless steel, for example, a stainless steel of the grade 304. The blank (30; 40) comprises a core (30b; 40b) made of a material that is highly heat-conductive or formed by an assembly of materials that are highly heat-conductive (aluminum alloy, copper, etc.). The blank preferably comprises another outer surface (30c; 40c) made of ferritic stainless steel, to enable the induction heating of the cooking vessel (1).

As is more clearly depicted in FIG. 1a, the texturized interior surface (3) of the vessel body (2) has a plurality of ribs (10). The ribs (10) form a screen on the texturized interior surface (3).

As is more clearly depicted in FIG. 2, the ribs (10) extend above the valleys (15). The valleys (15) have bottom surfaces (16) that are coated with a non-stick coating (7). The ribs (10) have uncoated top surfaces (11). The ribs (10) have side surfaces (12) that are distinct from the bottom surfaces (16) of the valleys (15). In other words, the side surfaces (12) of the ribs (10) extend above the bottom surfaces (16) of the valleys (15). The side surfaces (12) of the ribs (10) extend above the non-stick coating (7) covering the bottom surfaces (16) of the valleys (15). The side surfaces (12) of the ribs (10) connect the top surfaces (11) of the ribs (10) to the bottom surfaces (16) of the valleys (15). The non-stick coating (7) extends up the side surfaces (12) of the ribs (10) from the bottom surfaces (16) of the valleys (15) toward the top surfaces (11) of the ribs (10), without exceeding the height of the top surfaces (11). Thus the top uncoated surfaces (11) form a support surface for a cooking utensil used to stir, separate or serve foods, such as, for example, a spatula.

The non-stick coating (7) covering the valleys (15) is protected from the movements of the spatula by the top surfaces (11) of the ribs (10). The ribs (10) are preferably distributed across the texturized interior surface (3) of the vessel body (2) such that the distance between the top surfaces (11) of two neighboring, or adjacent, ribs (10) is less than or equal to 2 cm, irrespective of orientation.

The narrowness of the top surfaces (11) of the ribs (10) makes it possible to minimize contact between foods and the surfaces made of stainless steel, and thus to improve the ease of cleaning of the cooking surface. The width of the top surfaces (11) as defined by their smallest surface dimension is advantageously between 100 μm and 2 mm.

As illustrated in FIGS. 1 and 1a, the texturized interior surface (3) comprises a stainless steel grid. The grid is formed by the top surfaces (11) of the ribs (10) depicted in FIG. 2. The ribs (10) are interconnected and delimit distinct valleys (15). In other words, the ribs (10) separate the valleys (15). The ribs (10) thus form a continuous grid network. The crevices in the grid are filled by the non-stick coating (7).

More specifically in the embodiment illustrated in FIGS. 1 and 1a, the ribs (10) extend in two perpendicular directions and form a square grid.

The stainless steel grid formed by the top surfaces (11) of the ribs (10) ensures the protection of the non-stick coating (7). The stainless steel grid may take the form of a polygon grid (for example a square, rectangular, triangular, diamond or hexagonal grid), or an elliptic grid (for example, juxtaposed ellipses or circles). The surface of the grid network (irrespective of form) is preferably between 0.25 mm$^2$ and 1 cm$^2$. The ratio between the surface defined by the grid and the total surface (of the area in which the grid is present) is between 0.02 and 0.25 In other words, the top surfaces (11) of the ribs (10) constitute between 2% to 25% of the cooking surface.

In one variation, two adjacent ribs (10) are not necessarily parallel or perpendicular.

In one variation, the grid is not necessarily continuous. At least some valleys (15) may be interconnected. At least some ribs (10) may be surrounded by valleys (15).

As depicted in FIG. 2, the bottom surfaces (16) of the valleys (15) and the side surfaces (12) of the ribs (10) have a roughened surface (6) underneath the non-stick coating (7) to improve the adhesion of the non-stick coating (7).

In the embodiment depicted in the figures, the width of the top surfaces (11) of the ribs (10) is less than the width of the bottom surfaces (16) of the valleys (15) extending between two adjacent ribs (10). The top surfaces (11) of the ribs (10) are flat. The ribs (10) are of a trapezoidal configuration.

As depicted in FIG. 2, the side surfaces (12) of the ribs (10) form ramps that connect the top surfaces (11) of the ribs (10) to the bottom surfaces (16) of the valleys (15). In other words, the side surfaces (12) of the ribs (10) are inclined and form slopes extending up from the bottom surfaces (16) of the valleys (15). Thus the non-stick coating (7) covering the bottom surfaces (16) of the valleys (15) may extend up progressively to cover the side surfaces (12) of the ribs (10). As depicted in FIG. 2, the thickness of the non-stick coating is greater on the lower portion of the side surfaces (12) of the ribs (10) than on the upper portion of the side surfaces (12) of the ribs (10).

Advantageously, as depicted in FIG. 2, the side surfaces (12) of the ribs (10) extend up from the bottom surfaces (16) of the valleys (15) at an angle ($\alpha$) less than 45°. Preferably, the angle is between 20° and 40°.

The depth of cut defined between the top surfaces (11) of the ribs (10) and the bottom surfaces (16) of the valleys (15) is preferably between 0.05 mm and 0.2 mm. The intended depth of cut is, for example, approximately 0.1 mm.

As depicted in FIG. 2, the side surfaces (12) of the ribs (10) are covered by the non-stick coating (7); the top surfaces (11) of the ribs (10) are not covered by the non-stick coating (7).

The non-stick coating (7) may be selected from various types.

In one embodiment, the non-stick coating (7) has an outer layer of PTFE (polytetrafluoroethylene).

In another embodiment, the non-stick coating (7) has an outer layer of ceramic sol-gel.

As desired, at least one intermediary layer may be applied underneath the outer layer.

The non-stick coating (7), as it constitutes a significant proportion, typically the majority, of the cooking surface, makes it possible to obtain an ease of cleaning. The presence of the top surfaces (11) of the ribs (10) makes it possible to produce a support surface allowing for the use of rigid utensils used to stir, cut and serve foods, and in particular the use of metal utensils such as spatulas or knives, without damaging the non-stick coating (7) on the bottom surfaces (16) of the valleys (15).

This construction of the cooking surface makes it possible to combine the ease of cleaning guaranteed by the non-stick coating (7) with the improved durability of the cooking vessel (1) guaranteed by the metal grid formed by the top surfaces (11) of the ribs (10) that protect the integrity of the non-stick coating (7) on the bottom surfaces (16) of the valleys (15) against mechanical stress.

The juxtaposition of the uncoated top surfaces (11) and the coated valleys (15) improves scratch-resistance without sacrificing non-stick properties. This juxtaposition also makes it possible to differentiate the cooking surface.

When a stainless steel sheet is used, the method to produce a cooking vessel (1) according to the invention may comprise the following steps, depicted in FIGS. 3 to 8a:

- Realization or provision of a blank (20) from a sheet of stainless steel,
- Drawing of the blank (20) to form a cap (21) comprising an interior surface (22) and an exterior surface (23), the interior surface (22) comprising a flat base area (24) surrounded by a side wall (25),
- Hot stamping of a diffuser base (8) onto the exterior surface (23) of the cap (21), with the engraving of a grid pattern (27) on at least one portion of the base area (24) of the interior surface (22) of the cap (21), to form a network of ribs (10) having top surfaces (11) that extend above the valleys (15) and side surfaces (12) that are distinct from the bottom surfaces (16) of the valleys (15) the side surfaces (12) of the ribs (10) connecting the top surfaces (11) of the ribs (10) to the bottom surfaces (16) of the valleys (15), Sanding of at least the engraved base area (24) of the interior surface (22) of the cap (21) to create roughness (26),
- Application of a non-stick coating (7) onto at least the engraved, sanded base area (24),
- Brushing and/or polishing of at least the engraved, sanded, coated base area (24) to reveal the stainless steel on the top surfaces (11) of the ribs (10).

Grid patterning of the base area (24) of the cooking surface is thus performed during the hot stamping process. A punch is used that bears the grid pattern (or design) intended to be engraved on the base of the cooking surface. The grid pattern may, for example, be engraved on the punch using electro-spark engraving.

The use of appropriate parameters during the stamping (preheating temperature, stamping power, etc.) thus makes it possible to ensure the adhesion of the stamped diffuser base (8) and to engrave the grid pattern on the base area (24) of the interior surface (22) with a uniform depth, the targeted depth being approximately 0.1 mm. The stamping operation makes it possible to engrave the design on the flat portion of the cooking vessel (1). This process thus does not allow for any engraving of the surface at the bending radius between the base area (24) and the side wall (25), or of the side wall (25).

In a preferred embodiment, the process consists of hot stamping a base plate (9) of ferritic stainless steel onto the surface of the diffuser base (8) that is opposite the cap (21), when the diffuser base (8) is hot stamped onto the exterior surface (23) of the cap (21). A cooking vessel (1) that may be heated by induction may thus be obtained. The base plate (9) preferably has the form of a disc. As desired, the base plate (9) may be added.

When a multilayer stainless steel sheet comprising at least one outer surface made of stainless steel is used, the method to produce a cooking vessel (1) according to the invention may comprise the following steps, depicted in FIGS. 9 to 14a:

- Realization or provision of a blank (30) from a multilayer sheet of steel (30a; 30b; 30c) comprising at least one outer surface (30a) made of stainless steel,
- Engraving of a grid pattern (37) of at least one portion of said outer surface (30a) of stainless steel to form a network of ribs (10) having top surfaces (11) that extend above the valleys (15) and side surfaces (12) that are distinct from the bottom surfaces (16) of the valleys (15), the side surfaces (12) of the ribs (10) connecting the top surfaces (11) of the ribs (10) to the bottom surfaces (16) of the valleys (15),
- Drawing of the blank (30) to form a cap (31) comprising an interior surface (32) and an exterior surface (33), the interior surface (32) comprising a base area (34) surrounded by a side wall (35), the ribs (10) extending across at least a portion of the base area (34),
- Sanding of at least the engraved base area (34) to create roughness (36),
- Application of a non-stick coating (7) onto at least the engraved, sanded base area (34),
- Brushing and/or polishing of the engraved, sanded, coated base area (34) to reveal the stainless steel on the top surfaces (11) of the ribs (10).

The design may be engraved in a uniform manner across the entire cooking surface formed by the interior surface (32) as drawing does not degrade the grid pattern (37).

A stamping operation, preferably hot stamping, may be used to engrave the design. This operation makes it possible to engrave the desired grid pattern on the outer surface (30a) made of stainless steel. In the same manner described for a cooking vessel with a stamped base, a punch and electro-spark engraved screen may be used for the stamping operation.

In the aforementioned embodiment, the stamping operation is performed prior to drawing.

In one variation, the drawing of the blank may be performed prior to the engraving of a grid pattern. The method to produce a cooking vessel (1) according to the invention may thus comprise the following steps, depicted in FIGS. 15 to 20a:

- Realization or provision of a blank from a multilayer sheet of steel (40a; 40b; 40c) comprising at least one outer surface (40a) made of stainless steel,
- Drawing of the blank (40) to form a cap (41) comprising an interior surface (42) formed by said outer surface (40a) made of stainless steel and an exterior surface (43), the interior surface (42) comprising a flat base area (44) surrounded by a side wall (45),
- Engraving of a grid pattern (47) over at least one portion of the base area (44) to form a network of ribs (10) having top surfaces (11) that extend above the valleys (15) and side surfaces (12) that are distinct from the bottom surfaces (16) of the valleys (15), the side surfaces (12) of the ribs (10) connecting the top surfaces (11) of the ribs (10) to the bottom surfaces (16) of the valleys (15),
- Sanding of at least the engraved base area (44) to create roughness (46),
- Application of a non-stick coating (7) onto at least the engraved, sanded base area (44),
- Brushing and/or polishing of the engraved, sanded, coated base area (44) to reveal the stainless steel on the top surfaces (11) of the ribs (10).

The engraving of a grid pattern (47) is then performed on at least one portion of the flat base area (44) after the blank (40) is drawn. This process thus does not allow for any engraving of the surface at the bending radius between the base area (44) and the side wall (45), or on the side wall (45).

The surface to be coated is sanded to create sufficient roughness (26; 36; 46) to enable the maximum adhesion of the non-stick coating (7) without damaging the top surfaces (11) formed during the engraving process.

Optionally, the top surfaces (11) of the ribs (10) are polished prior to the application of the non-stick coating (7) to limit the adhesion of the non-stick coating (7) on the top surfaces (11) of the ribs (10).

For PTFE-type non-stick coatings, sanding may be performed, in particular, with a brown corundum (α-alumina). The following roughness parameters are envisioned for roughness (26; 36; 46):

Ra≥2 µm, preferably 3 µm≤Ra≤5 µm
Rz≥25 µm, preferably 30 µm≤Rz≤50 µm

Ra and Rz are defined in the ISO standard 4287 Ra is defined as the arithmetical mean deviation of the assessed profile; Rz represents the average distance between the five highest peaks and 5 lowest valleys.

Surface topography may be studied, in particular, with a diamond-tipped stylus probe profilometer, or with an optical profiler such as an Altisurf® device, in which a chromatic confocal sensor enables non-contact profilometry. The study of this surface topography makes it possible to determine the surface roughness parameters, as defined above.

The PTFE-type non-stick coating (7) may be sprayed onto the surface after the surface has been sanded. As desired, at least one intermediary layer may be applied prior to applying the outer layer of the PTFE-type non-stick coating (7). After cooking the non-stick coating (7) at 420° C., the texturized interior surface (3), and, as desired, the non-texturized interior surface (4) of the interior of the cooking vessel (2) are polished. The polishing makes it possible to reveal the stainless steel grid network by selectively revealing the top surfaces (11) of the ribs (10), the coated valley (15) being unaffected by this operation. Furthermore, the exterior of the vessel body (2) is also polished to remove the oxide layer that appears during the PTFE coating cooking process.

When a non-stick coating (7) has an outer layer of ceramic sol-gel, the surface to be re-coated is sanded to create enough roughness to ensure maximum adhesion of the non-stick coating (7) without damaging the top surfaces (11) formed during the engraving process. Sanding may be performed, in particular, with a zirconia corundum abrasive.

When ceramic coatings are used, the sanding conditions are adjusted to produce the following roughness parameters for roughness (26; 36; 46):

Ra≥1.5 µm, preferably 2 µm≤Ra≤3 µm
Rz≥10 µm, preferably 15 µm≤Rz≤30 µm

The ceramic sol-gel non-stick coating (7) may be sprayed onto the surface that has undergone a sanding treatment. A coating thickness of 20 to 40 µm may be targeted. The cooking cycle for the sol-gel coating applied to a stainless steel substrate may comprise an increase in temperature to 250° C. over a period of 15 minutes, followed by 15 minutes of cooking at 250° C. Polishing of the interior of the cooking vessel (2) makes it possible to reveal the surface of the stainless steel grid network formed by the top surfaces (11) of the ribs (10), by selectively removing the sol-gel coating from the top surfaces (11) of the ribs (10). The ceramic-coated valleys (15) are not affected by such an operation. Furthermore, the exterior of the vessel body (2) is also polished to remove the oxide layer that appears during the sol-gel cooking process.

As depicted in FIGS. 8a, 14a and 20a, the side surfaces (12) of the ribs (10) form ramps that connect the top surfaces (11) of the ribs (10) to the bottom surfaces (16) of the valleys (15).

As depicted in FIGS. 8a, 14a and 20a, the side surfaces (12) of the ribs (10) are covered by the non-stick coating (7); the top surfaces (11) of the ribs (10) are not covered by the non-stick coating (7).

In one variation, the ribs (10) are not necessarily produced by hot or cold stamping. Laser engraving may be performed on the blank (20; 30; 40) before or after drawing. The use of a high-powered laser makes it possible to obtain both the desired depth of cut (approximately 50 to 100 µm) and the desired narrowness of the top surfaces (11) of the ribs (10). As desired, a stamping operation may be used, in particular to assemble the diffuser base (8) and, where applicable, the ferritic stainless steel base plate (9) when the blank (20) is made of stainless steel.

The present invention is in no way limited to the described example embodiments and variations, but encompasses numerous modifications within the scope of the claims.

The invention claimed is:

1. A cooking vessel comprising a vessel body with a texturized interior surface made of partially coated stainless steel, the texturized interior surface having a plurality of ribs extending above bottom surfaces of valleys, the bottom surfaces being coated with a non-stick coating, the ribs having uncoated top surfaces and side surfaces distinct from the bottom surfaces of the valleys, the side surfaces of the ribs connecting the top surfaces of the ribs to the bottom surfaces of the valleys, said top surfaces of the ribs extending above the non-stick coating covering the bottom surfaces of the valleys, the bottom surfaces of the valleys and the side surfaces of the ribs having a roughened surface underneath the non-stick coating, to promote adhesion of the non-stick coating, wherein the side surfaces of the ribs are angled to form ramps connecting the top surfaces of the ribs to the bottom surfaces of the valleys, and in that the non-stick coating extends up the side surfaces of the ribs from the bottom surfaces of the valleys to the top surfaces of the ribs without exceeding a height of the top surfaces,
wherein a thickness of the non-stick coating is greater on a lower portion of the side surfaces of the ribs than on an upper portion of the side surfaces of the ribs.

2. The cooking vessel as in claim 1, wherein a width of the top surfaces of the ribs is less than a distance between the top surfaces of two adjacent ribs.

3. The cooking vessel as in claim 1, wherein a width of the top surfaces of the ribs is less than a width of the bottom surfaces of the valleys between two adjacent ribs.

4. The cooking vessel as in claim 1, wherein the side surfaces of the ribs extend upwards from the bottom surfaces of the valleys at an angle less than 45°.

5. The cooking vessel as in claim 1, wherein the top surfaces of the ribs are flat.

6. The cooking vessel as in claim 1, wherein the ribs are of a trapezoidal configuration.

7. The cooking vessel as in claim 1, wherein a depth of cut defined between the top surfaces of the ribs and the bottom surfaces of the valleys is between 0.05 and 0.2 mm.

8. The cooking vessel as in claim 1, wherein the non-stick coating has an outer layer of PTFE.

9. The cooking vessel as in claim 1, wherein the non-stick coating has an outer ceramic sol-gel layer.

10. The cooking vessel as in claim 1, wherein the cooking vessel comprises at least one handle mounted to the vessel body.

11. The cooking vessel as in claim 1, wherein the ribs are interconnected so as to delimit distinct valleys.

12. The cooking vessel as in claim 1,
wherein the side surfaces of the ribs extend upwards from the bottom surfaces of the valleys at an angle between 20° and 40°.

13. The cooking vessel as in claim 12, wherein a width of the top surfaces of the ribs is less than a distance between the top surfaces of two adjacent ribs.

14. The cooking vessel as in claim 12, wherein a width of the top surfaces of the ribs is less than a width of the bottom surfaces of the valleys between two adjacent ribs.

15. The cooking vessel as in claim 12, wherein the top surfaces of the ribs are flat.

16. The cooking vessel as in claim 12, wherein the ribs are of a trapezoidal configuration.

17. The cooking vessel as in claim 12, wherein a depth of cut defined between the top surfaces of the ribs and the bottom surfaces of the valleys is between 0.05 and 0.2 mm.

18. The cooking vessel as in claim 12, wherein the non-stick coating has an outer layer of PTFE.

19. The cooking vessel as in claim 12, wherein the non-stick coating has an outer ceramic sol-gel layer.

20. The cooking vessel as in claim 12, wherein the cooking vessel comprises at least one handle mounted to the vessel body.

21. The cooking vessel as in claim 12, wherein the ribs are interconnected so as to delimit distinct valleys.

\* \* \* \* \*